US012330258B2

(12) United States Patent
Song

(10) Patent No.: US 12,330,258 B2
(45) Date of Patent: Jun. 17, 2025

(54) METHODS OF ULTRASONIC DRILLING FOR FORMING PERFORATIONS IN COMPOSITE MATERIALS

(71) Applicant: The Boeing Company, Chicago, IL (US)

(72) Inventor: Weidong Song, Woodinville, WA (US)

(73) Assignee: The Boeing Company, Arlington, VA (US)

( * ) Notice: Subject to any disclaimer, the term of this patent is extended or adjusted under 35 U.S.C. 154(b) by 1467 days.

(21) Appl. No.: 16/796,606

(22) Filed: Feb. 20, 2020

(65) Prior Publication Data

US 2021/0260712 A1 Aug. 26, 2021

(51) Int. Cl.
*B24B 1/04* (2006.01)
*B26D 7/08* (2006.01)

(52) U.S. Cl.
CPC ........... *B24B 1/04* (2013.01); *B26D 7/086* (2013.01)

(58) Field of Classification Search
CPC .................................. B26D 7/086; B26D 7/10
See application file for complete search history.

(56) References Cited

U.S. PATENT DOCUMENTS

| | | | |
|---|---|---|---|
| 4,747,895 A | 5/1988 | Wallerstein et al. | |
| 5,061,331 A * | 10/1991 | Gute ...................... | B26D 7/018 |
| | | | 156/251 |
| 5,207,956 A | 5/1993 | Kline et al. | |
| 5,318,420 A * | 6/1994 | Blaimschein ............ | B26D 7/10 |
| | | | 425/301 |
| 5,648,107 A | 7/1997 | Kagawa et al. | |
| 6,190,602 B1 | 2/2001 | Blaney et al. | |
| 8,834,668 B2 | 9/2014 | Nelson et al. | |
| 2011/0162495 A1 | 7/2011 | Sugiyama et al. | |
| 2012/0283348 A1 | 11/2012 | Akita et al. | |
| 2014/0302446 A1 | 10/2014 | Anderson et al. | |
| 2014/0318693 A1 | 10/2014 | Nelson et al. | |

(Continued)

FOREIGN PATENT DOCUMENTS

| | | |
|---|---|---|
| CN | 104837605 | 8/2015 |
| CN | 105936131 | 9/2016 |

(Continued)

OTHER PUBLICATIONS

China National Intellectual Property Administration, Office action in related China Patent Application No. 202110195313.7, Aug. 15, 2024.

(Continued)

*Primary Examiner* — Jason L Vaughan
(74) *Attorney, Agent, or Firm* — Kolitch Romano Dascenzo Gates LLC

(57) ABSTRACT

Methods of ultrasonic drilling may be used to form perforated sheets by forming holes through a workpiece using a needle or needle array operatively coupled to an ultrasonic actuator. The needle is brought to repeatedly contact the surface of the workpiece at an ultrasonic operating frequency, thereby forming the hole through the workpiece. Such steps are repeated to form a plurality of holes in the workpiece, thereby forming a perforated sheet which may be used in an acoustic liner for noise attenuation. The workpiece may be heated while the holes are formed, via a remote heating unit that locally heats a portion of the workpiece.

17 Claims, 10 Drawing Sheets

(56) References Cited

U.S. PATENT DOCUMENTS

| | | |
|---|---|---|
| 2016/0214328 A1 | 7/2016 | MacAdams et al. |
| 2017/0355150 A1 | 12/2017 | Wang et al. |
| 2019/0030308 A1 | 1/2019 | Niitsu et al. |
| 2019/0030858 A1 | 1/2019 | Kameda et al. |
| 2019/0389167 A1 | 12/2019 | Marcus |
| 2020/0024782 A1 | 1/2020 | Takaki |
| 2022/0152861 A1 | 5/2022 | Johannison |
| 2023/0033918 A1 | 2/2023 | Xia et al. |

FOREIGN PATENT DOCUMENTS

| | | |
|---|---|---|
| EP | 1151850 | 7/2001 |
| EP | 1547753 | 6/2005 |
| EP | 2055464 | 5/2009 |
| EP | 2842672 | 3/2015 |
| EP | 3088152 | 11/2016 |
| FR | 2675711 | 10/1992 |
| JP | 2010072306 A | 4/2010 |
| JP | 2014218026 A | 11/2014 |
| JP | 2015033728 A | 2/2015 |
| JP | 2015145016 A | 8/2015 |
| JP | 2016084022 A | 5/2016 |
| JP | 6356975 | 7/2018 |
| JP | 2018134858 A | 8/2018 |
| JP | WO 2019/203074 | 10/2019 |

OTHER PUBLICATIONS

Machine generated English language translation for CN104837605, published Aug. 12, 2015.
Machine generated English language translation for CN105936131, published Sep. 14, 2016.
Machine generated English language translation of abstract for FR2675711, published Oct. 30, 1992.
European Patent Office, Extended European Search Report for related European patent application EP 21 15 7903, dated Jul. 7, 2021.
Machine-generated English translation of the abstract of JP 63 53975 B2, downloaded from Espacenet.com on Aug. 23, 2021.
Machine-generated English translation of the abstract of WO 2019/203074A1, downloaded from Espacenet.com on Aug. 23, 2021.
Japan Patent Office, Notice of Reasons for Refusal in Related Japan Patent Application, No. 2021-024210, Dec. 16, 2024.

* cited by examiner

METHODS OF ULTRASONIC DRILLING FOR FORMING PERFORATIONS IN COMPOSITE MATERIALS

FIELD

The present disclosure relates generally to methods of ultrasonic drilling and more particularly to forming perforations in composite materials using ultrasonic drilling.

BACKGROUND

Acoustic liners are often formed using thin materials with many small holes, or perforations, formed therein. For example, acoustic liners may be placed inside jet engines (e.g., in an engine inlet inner barrel) for noise attenuation (i.e. to dampen engine noise and/or reduce noise pollution on aircraft). These acoustic liners are often formed by placing a perforated sheet of material (e.g., metal or graphite sheets) over a honeycomb core material, which is often sandwiched between the perforated sheet and an impervious layer, or backplate.

The perforated sheets are formed by punching or drilling hundreds of thousands, or even a million or more, small holes through thin metal or composite material sheets. Conventional methods involve drilling these holes one at a time, which is time- and capital-intensive, and therefore expensive from a build cycle standpoint. In some cases, such drilling may take over a week of robotic drilling operations, with each individual hole taking anywhere from one to five seconds to drill. In addition, tooling costs for forming such perforations is expensive in terms of wear on drill bits that requires frequent replacement, especially in the case of drilling in composite materials (e.g., carbon fiber or glass fiber reinforced polymers) and/or other thermoplastic materials. Additionally, drill bits often need to be made from expensive materials such as tool steel that are difficult to machine. Attempts have been made to drill multiple holes at once, though such attempts have been limited to drilling 4-12 holes at once due to the rotational movement requirement by such drilling operations.

Ultrasonic drilling is a technique that uses high frequency, low amplitude vibrations of a tool, or bit, against a workpiece surface to remove material from the workpiece by micro-chipping or erosion with abrasive particles. As opposed to traditional drilling methods, which use rotation to cut through materials, ultrasonic drilling relies on axial vibrations to essentially hammer the bit into the material. An example of a prior art ultrasonic drilling machine 10 is illustrated in FIG. 1. Ultrasonic drilling machine 10 includes a piezoelectric actuator 12 as its source of power, and utilizes a variety of horns 14 to vibrate a bit through workpiece 16 in the presence of fine abrasive particles. The fine abrasive particles are mixed with water to form a slurry stored in a slurry tank 18. A slurry pump 20 distributes the slurry across workpiece 16 and the tip of the bit via a line and nozzle 22, which is needed to remove material from workpiece 16 while keeping the bit clean and effective. The slurry also serves as a coolant to keep the material and bit cool so as to prevent damage to the workpiece and bit. The slurry is returned to slurry tank 18 via slurry return line 24, which serves to carry debris away from the cutting area. The ability of the slurry, or cutting fluid, to reach the bit limits the depth to which ultrasonic drilling machines may be used because ultrasonic drilling bits do not include slots to allow access of the slurry like those used with rotational drills.

Hard and/or brittle materials have successfully been machined using ultrasonic drilling, such as semi-conductors, stainless steel, glass, ceramics, carbide, quartz, stones, tungsten, granite, rock, as well as delicate bones for medical applications. Attempts to utilize ultrasonic drilling methods with composite materials (e.g., carbon fiber reinforced plastics) have been limited to applying ultrasonic vibrations to rotary drill bits, which must be cooled using a slurry or other cooling fluids during drilling. Furthermore, drilling through composite materials tends to be difficult to do, costly, and often results in damage to the composite part.

SUMMARY

In one disclosed method of performing ultrasonic drilling to form a hole in a workpiece at a first location of the workpiece, a surface of the workpiece is positioned with respect to a tool of an ultrasonic hone and the hole is formed in the workpiece by vibrating the tool along the longitudinal axis such that the tool repeatedly contacts the surface of the workpiece at an operating frequency sufficient to form the hole in the workpiece. The tool may have a longitudinal axis that is substantially orthogonal to the surface of the workpiece. In such methods, the tool is vibrated for a time sufficient to form the hole in the workpiece, though the tool is not rotated with respect to the surface of the workpiece during the forming the hole. Further, the hole may be formed without use of a slurry or a cooling fluid. In some methods according to the present disclosure, the workpiece is composed of a composite material.

In another method according to the present disclosure, a plurality of perforations are formed in a thin sheet of a composite material. In such methods, a surface of the thin sheet and a needle array operatively coupled to an ultrasonic hone are arranged such that the needle array is positioned above a first region of the thin sheet. The needle array includes a plurality of needles extending along a longitudinal axis that is substantially orthogonal to the surface of the thin sheet. In the methods, the surface of the thin sheet is repeatedly contacted within the first region by the needle array at an operating frequency of above 20 kHz for a first period of time that is sufficient to form a first plurality of holes in the first region of the thin sheet. Such repeated contacting of the surface of the thin sheet causes a respective first hole to be formed in the thin sheet corresponding to each respective needle of the needle array. In the method, the needles of the needle array contact the thin sheet without rotating the plurality of needles about the longitudinal axis, without rotating the needles with respect to the thin sheet, and without use of a slurry or a cooling fluid.

Methods may also include translating the needle array with respect to the thin sheet (and/or vice versa), such that the needle array is positioned above a second region of the thin sheet and then again repeatedly contacting the surface of the thin sheet within the second region with the needle array at the operating frequency for a second period of time that is sufficient to form a second plurality of holes in the second region of the thin sheet. Again, a respective second hole may be formed in the thin sheet corresponding to each respective needle of the needle array. Such translating and repeatedly contacting the subsequent region of the thin sheet may be repeated any number of times to form the desired number of holes in the thin sheet. In each repetition, the surface of the thin sheet may be contacted by the plurality of needles of the needle array without rotating the plurality of needles about the longitudinal axis, without rotating the needles with respect to the thin sheet, and without use of the slurry or the cooling fluid.

Methods of forming an acoustic liner are also disclosed. In one example, a workpiece formed according to disclosed methods is coupled to a first side of a honeycomb structure. Said honeycomb structure also includes a second side opposite the first side and a plurality of internal cells extending between the first side and the second side. Each internal cell is sized to fit an acoustic plane wave in the internal cell for a desired frequency range such that the acoustic liner is configured to produce noise attenuation properties for the desired frequency range. In the methods, a rigid backplate is coupled to the second side of the honeycomb structure, thereby forming the acoustic liner.

Acoustic liners also are disclosed. One example of a disclosed acoustic liner includes a thin sheet material composed of a carbon-fiber reinforced polymer and at least 100,000 circular or non-circular perforations formed through a thickness of the thin sheet material. The thin sheet material may be formed according to presently disclosed methods. The acoustic liner also may include a honeycomb structure and a rigid backplate. The honeycomb structure includes a first side, a second side opposite the first side, and a plurality of internal cells extending between the first side and the second side. The first side of the honeycomb structure is coupled to the thin sheet material and the second side of the honeycomb structure is coupled to the rigid backplate. Each internal cell of the plurality of internal cells is sized to fit an acoustic plane wave in the internal cell for a desired frequency range such that the acoustic liner is configured to produce noise attenuation properties for the desired frequency range.

DESCRIPTION

Figure 1:
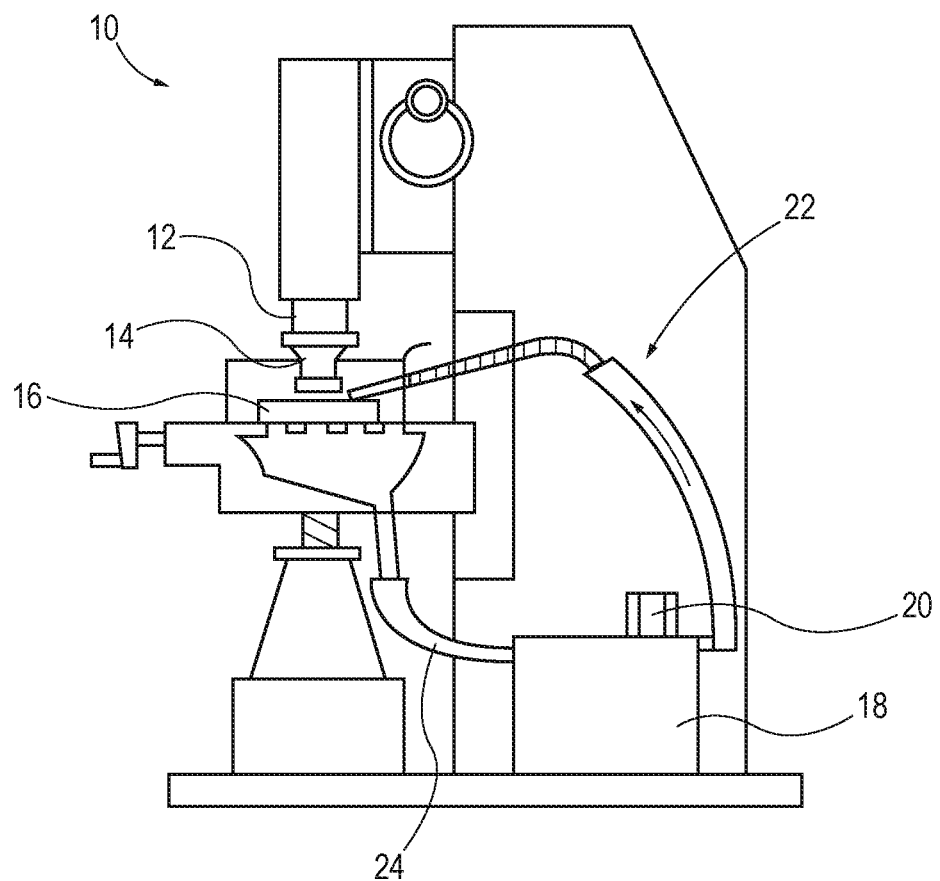
FIG. 1 is an elevation view of a prior art ultrasonic drilling apparatus.
Figure 2:
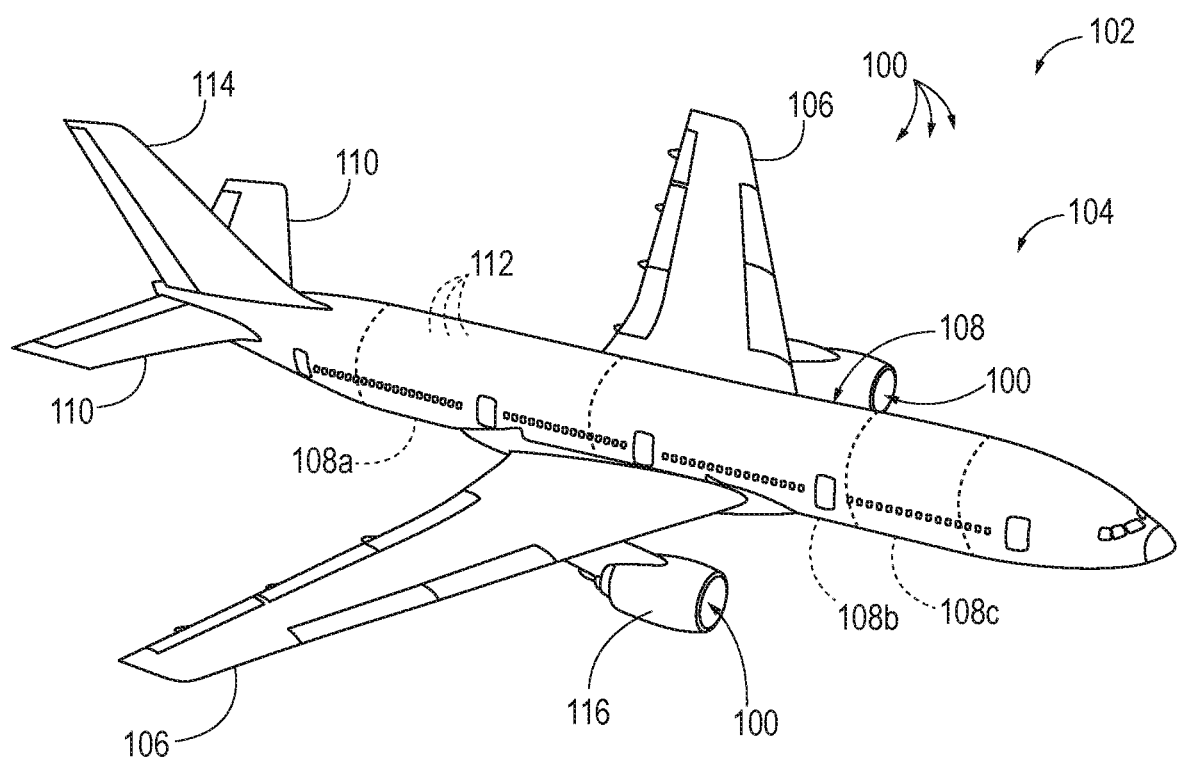
FIG. 2 is a schematic representation of an apparatus that may include one or more acoustic liners according to the present disclosure, and/or one or more acoustic liners formed according to methods of the present disclosure.

With reference to FIG. 2, one or more perforated sheets 100 may be included in an apparatus 102. Perforated sheets 100 may be utilized in many different industries and applications, such as aerospace, automotive, electronic, construction, military, recreation, and/or motorsport industries. In FIG. 2, an example of apparatus 102 that may include one or more perforated sheets 100 generally is illustrated in the form of an aircraft 104. Aircraft 104 may take any suitable form, including commercial aircraft, military aircraft, or any other suitable aircraft. While FIG. 2 illustrates aircraft 104 in the form of a fixed wing aircraft, other types and configurations of aircraft are within the scope of aircraft 104 according to the present disclosure, including (but not limited to) rotorcraft and helicopters.

Apparatus 102 (e.g., aircraft 104) may include one or more perforated sheets 100. As illustrative, non-exclusive examples, perforated sheets 100 may be utilized in engine housings 116, though other components of aircraft 104, such as wings 106, fuselages 108 or fuselage sections 108a, 108b, 108c, horizontal stabilizers 110, overhead storage bins 112, vertical stabilizers 114, and others additionally or alternatively may include one or more perforated sheets 100. Other applications in aircraft 104 for perforated sheets 100 may include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 102 (including one or more perforated sheets 100) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

FIGS. 3-9 and 13-14 provide illustrative, non-exclusive examples of systems 30, acoustic liners 33, needles 36, and/or needle arrays 60 according to the present disclosure. Elements that serve a similar, or at least substantially similar, purpose are labeled with like numbers in each of FIGS. 3-9 and 13-14 (and throughout the specification in general), and these elements may not be discussed in detail herein with reference to each of FIGS. 3-9 and 13-14. Similarly, all elements may not be labeled in each of FIGS. 3-9 and 13-14, but reference numerals associated therewith may be utilized herein for consistency. Elements, components, and/or features that are discussed herein with reference to one or more of FIGS. 3-9 and 13-14 may be included in and/or utilized with any of FIGS. 3-9 and 13-14 without departing from the scope of the present disclosure. In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure. Where appropriate, the reference numerals from each of FIGS. 3-9 and 13-14 are used to designate corresponding parts of others of FIGS. 3-9 and 13-14 however, the examples of FIGS. 3-9 and 13-14 are non-exclusive and may incorporate any number of the various aspects, configurations, characteristics, properties, etc. that are illustrated in and discussed with reference to others of FIGS. 3-9 and 13-14 as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 3-9 and 13-14; however, it is within the scope of the present disclosure that the previously discussed features, variants, etc. may be utilized with any of the same.

Figure 3:
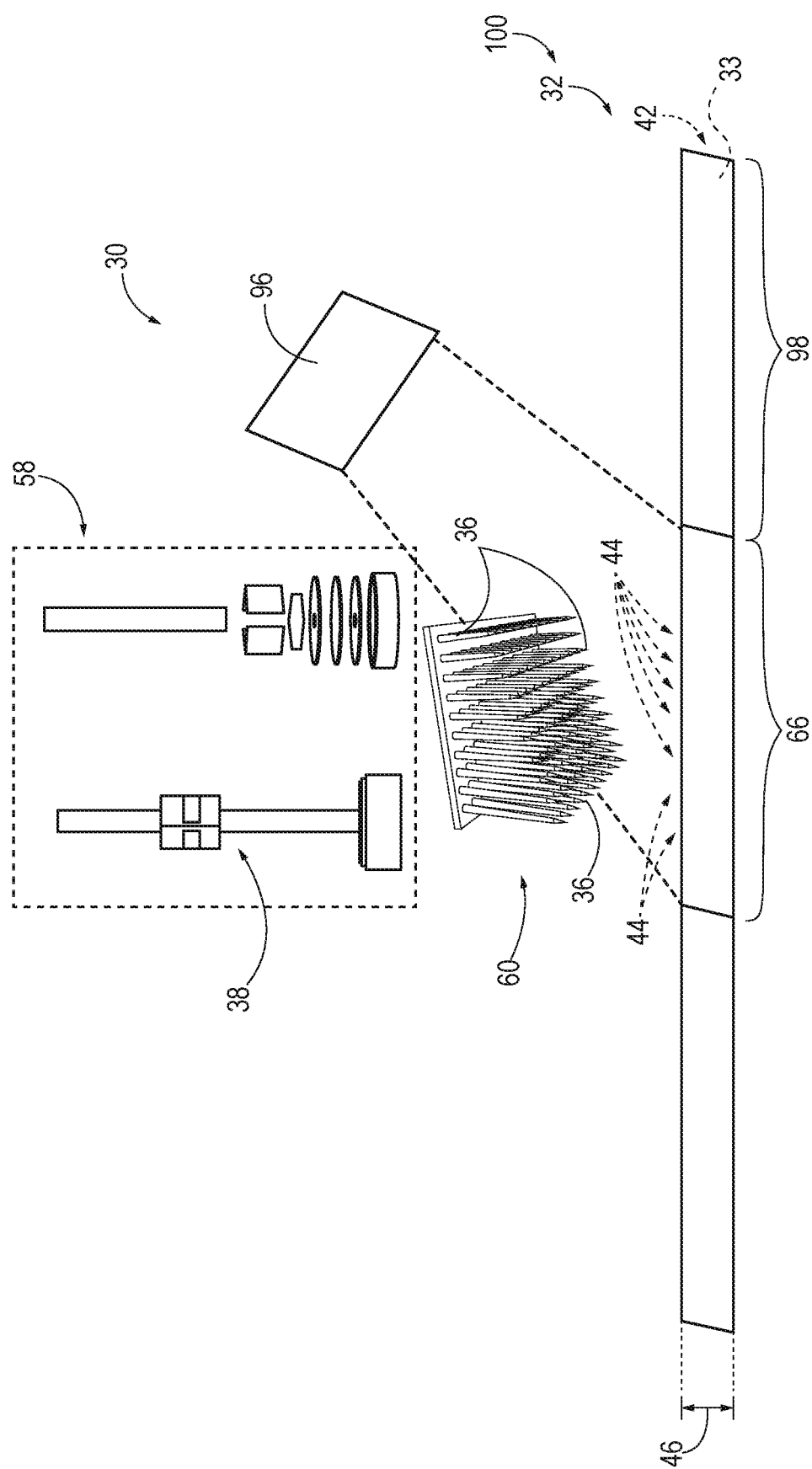
FIG. 3 is a schematic representation of examples of systems for performing ultrasonic drilling methods according to the present disclosure.

FIG. 3 schematically illustrates systems 30 according to the present disclosure. Such systems 30 may be used to form one or more holes in a workpiece 32 (which is an example of perforated sheet 100). In some examples, systems 30 may be used to perforate workpiece 32 and/or to form some or all of an acoustic liner 33 (which may be an example of workpiece 32). According to the present disclosure, and as will be described in more detail herein, one or more holes may be formed in (e.g., through) workpiece 32 by repeatedly contacting a surface 34 of workpiece 32 with one or more needles 36 (which may be arranged as a needle array 60) operatively coupled to an ultrasonic actuator 38 configured to vibrate the one or more needles 36 along a longitudinal axis 40 at an ultrasonic operating frequency and amplitude for a time sufficient to form one or more holes in workpiece 32. The combination of ultrasonic actuator 38 and needle 36 (or needle array 60) may be referred to herein as an ultrasonic drilling apparatus 58. In some examples, ultrasonic drilling apparatus 58 includes a horn coupling needle array 60 to ultrasonic actuator 38, with said horn being configured to amplify the vibrations along longitudinal axis 40.

Figure 6:
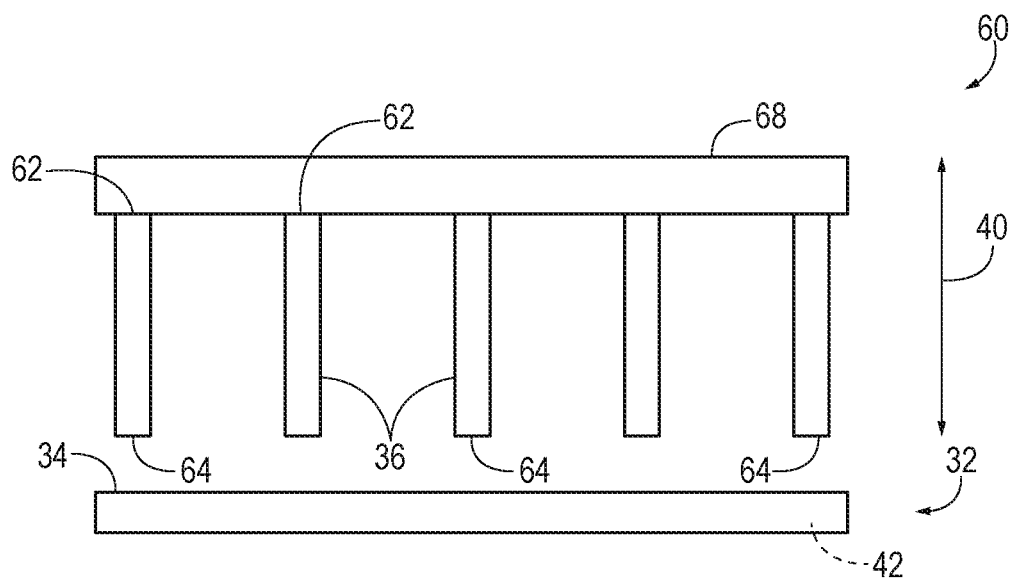
FIG. 6 is a schematic representation of examples of needle arrays according to the present disclosure, from a side elevation view.

Generally, systems 30 are configured to form a respective hole through workpiece 32 for each respective needle 36 operatively coupled to ultrasonic actuator 38. Ultrasonic actuator 38 is configured to oscillate needle 36 (or needle array 60) at an ultrasonic frequency, such as via a piezoelectric transducer and electric oscillator. In various examples, ultrasonic actuator 38 may include a mechanical, electromagnetic, and/or thermal energy source. To form one or more holes in different regions, or areas, of workpiece 32, workpiece 32 may be translated with respect to needle 36, and/or needle 36 may be translated with respect to workpiece 32, such that needle 36 is positioned above a different region, or area, of workpiece 32. Needle 36 may then be brought to contact surface 34 repeatedly in said different area of workpiece 32 in order to form one or more additional holes in workpiece 32. Needle 36 (e.g., longitudinal axis 40 of needle 36 or of needles 36 of needle array 60) may be arranged such that it is at least substantially orthogonal to surface 34 (e.g., as shown in FIG. 6). In other examples, needle 36 may contact surface 34 at a non-orthogonal angle to surface 34.

Systems 30 are configured to form perforations 44 through workpiece 32 in a manner different than conventional drilling. Rather than rotating a drill bit at high speeds to cut through material (as is done with conventional drilling), needle 36 is not rotated with respect to surface 34 of workpiece 32 (nor is workpiece 32 rotated with respect to needle 36) during formation of perforations 44. Similarly, needle array 60 is not rotated with respect to surface 34 of workpiece 32 (nor is workpiece 32 rotated with respect to needle array 60) during formation of perforations 44. Furthermore, conventional drilling requires the use of a cooling fluid to prevent damage to the drill bits and parts due to the heat produced during rotational drilling, and conventional ultrasonic drilling that still involves rotation of drill bits requires the use of a slurry to cool the part and/or carry away debris. On the other hand, presently disclosed ultrasonic drilling apparatus 58 is configured to operate without use of a slurry or a cooling fluid (though either or both may optionally be used, if desired).

Figure 4:
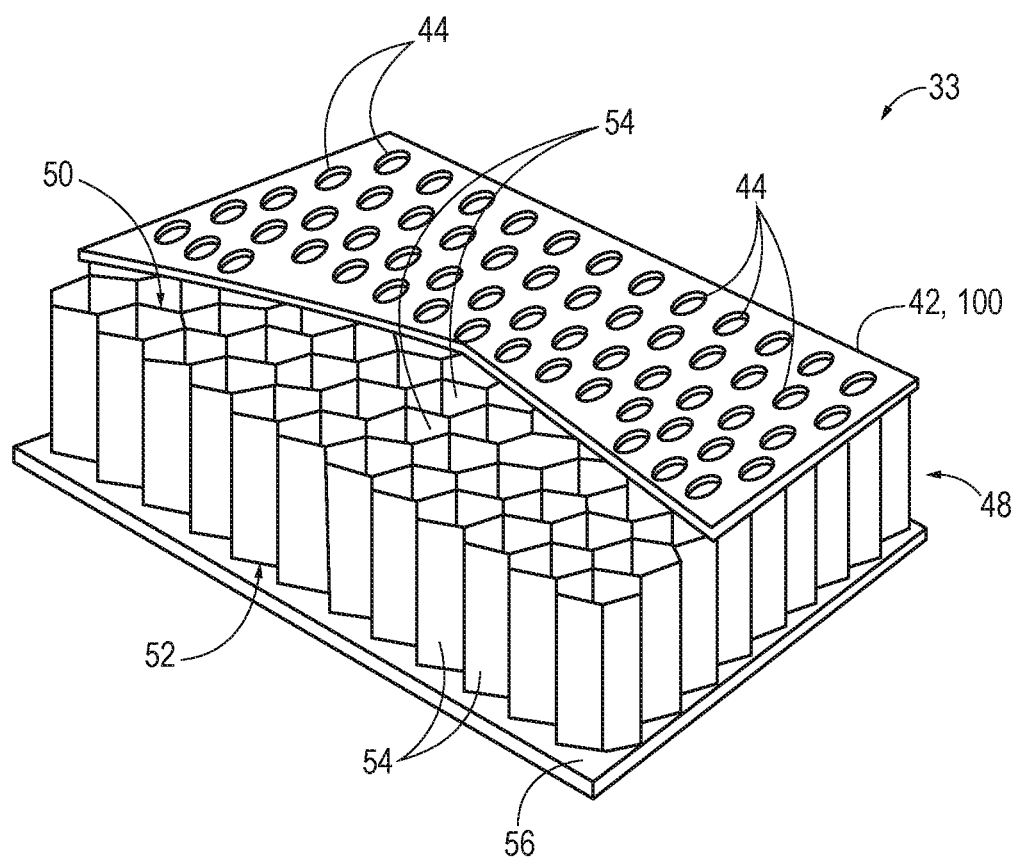
FIG. 4 is a perspective view of an example of an acoustic liner formed according to methods of the present disclosure.

Such systems 30 may be used to form any number of holes (including a single hole) in or through a variety of materials, though in some examples may be used to form acoustic liner 33, an example of which is shown in FIG. 4. Acoustic liner 33 includes a thin sheet material 42 (which is an example of workpiece 32 and perforated sheet 100) having a plurality of perforations 44 formed therethrough. Said perforations 44 are holes that extend through an entire thickness 46 (FIG. 3) of thin sheet material 42. In some specific examples, thickness 46 of thin sheet material 42 may be less than 0.25 inches, less than 0.1 inches, less than 0.05 inches, and/or less than 0.025 inches thick. Thin sheet material 42 generally is formed of composite material, though may be formed of other material, including metals and ceramics.

Acoustic liner 33 also includes a honeycomb structure 48 having a first side 50, a second side 52 opposite first side 50, and a plurality of internal partitions, or internal cells 54, extending between first side 50 and second side 52. First side 50 is coupled to thin sheet material 42, and second side 52 is coupled to a rigid backplate 56, such that honeycomb structure 48 is sandwiched between thin sheet material 42 and rigid backplate 56. Each internal cell 54 is sized to fit an acoustic plane wave in the internal cell 54 for a desired frequency range such that acoustic liner 33 is configured to produce noise attenuation properties for the desired frequency range. For example, internal cells 54 may be sized according to the particular application for which acoustic liner 33 is designed, with the size of internal cells 54 being selectively varied according to the expected frequencies of noise expected in a given use. In this manner, acoustic liner 33 may be used for reducing noise pollution and/or for noise attenuation in a variety of applications. In one specific example, acoustic liner 33 may be configured for use in a jet engine housing in an aircraft, with internal cells 54 being sized to accommodate the range of acoustic plane waves produced by the jet engine such that acoustic liner 33 may be used to reduce noise pollution from an engine and/or for noise attenuation in an aircraft or other apparatus. Jet engines including acoustic liner 33 and aircraft including acoustic liner 33 are within the scope of the present disclosure.

Thin sheet material 42 may be formed of, for example, a carbon-fiber or glass fiber reinforced polymer, a thermoplastic material, a thermoset material, carbon fiber or glass fiber reinforced polyether ether ketone (PEEK), carbon fiber or glass fiber reinforced polyphenylene sulfide (PPS), carbon fiber or glass fiber reinforced epoxy, and/or carbon fiber or glass fiber reinforced polyetherketoneketone (PEKK). Rigid backplate 56 (which may also be referred to as an impervious layer, a back-sheet, or a back-skin) may be formed of any material that provides sufficient support for thin sheet material 42 and honeycomb structure 48, with suitable examples including metal, carbon fiber, and/or a fiber-based reinforced polymer. Honeycomb structure 48 may be formed of Nomex® honeycomb material, though other honeycomb structure materials are also within the scope of the present disclosure.

Thin sheet material 42 may include any number of perforations 44. In some examples, thin sheet material 42 includes at least 100 perforations, at least 1,000 perforations, at least 10,000 perforations, at least 100,000 perforations, and/or at least 1,000,000 perforations formed in the thin sheet material. Perforations 44 are illustrated in FIG. 4 as being substantially oval-shaped, though perforations 44 may be a variety of different shapes. For example, perforations 44 may include round (e.g., circular) and/or non-circular perforations 44, such as square, rectangular, triangular, polygonal, star-shaped, and/or diamond-shaped, perforations 44. Different shaped perforations 44 may be created using needles 36 with various cross-sectional shapes and/or by lateral motion of needle array 60 and/or workpiece 32 during formation of perforations 44. In some examples of acoustic liner 33, perforations 44 may all be of a substantial uniform size and shape. In other examples of acoustic liner 33, one or more perforations 44 may be a different size and/or shape than one or more other of perforations 44. For example, one or more perforations 44 may be larger in a given area of workpiece 32 than one or more other perforations 44 in another area of workpiece 32. In some examples, different sizes and/or shapes of perforations 44 may be interspersed among each other, distributed across the surface of workpiece 32.

Presently disclosed systems 30 (and related methods of ultrasonic drilling using such systems 30) may be configured to form perforated sheets using techniques and materials that may reduce the time needed to form such perforations in acoustic liners 33, for example, by forming multiple holes at once. In addition, needles 36 for disclosed ultrasonic drilling techniques may be made from less expensive materials than conventional drill bits, and/or via less expensive design and manufacturing approaches (e.g., additive manufacturing) which may reduce the costs associated with manufacturing the tooling. Disclosed techniques also may increase the life cycle of the tooling, which may further decrease costs. For example, because disclosed systems and needle arrays are effectively pushing fibers aside to form the perforations rather than cutting through the material, such techniques may improve resulting material properties in the workpiece and/or decrease wear on the tooling. Disclosed techniques also may be less labor intensive than conventional drilling techniques, which may thereby reduce manufacturing flow time.

Figure 5:
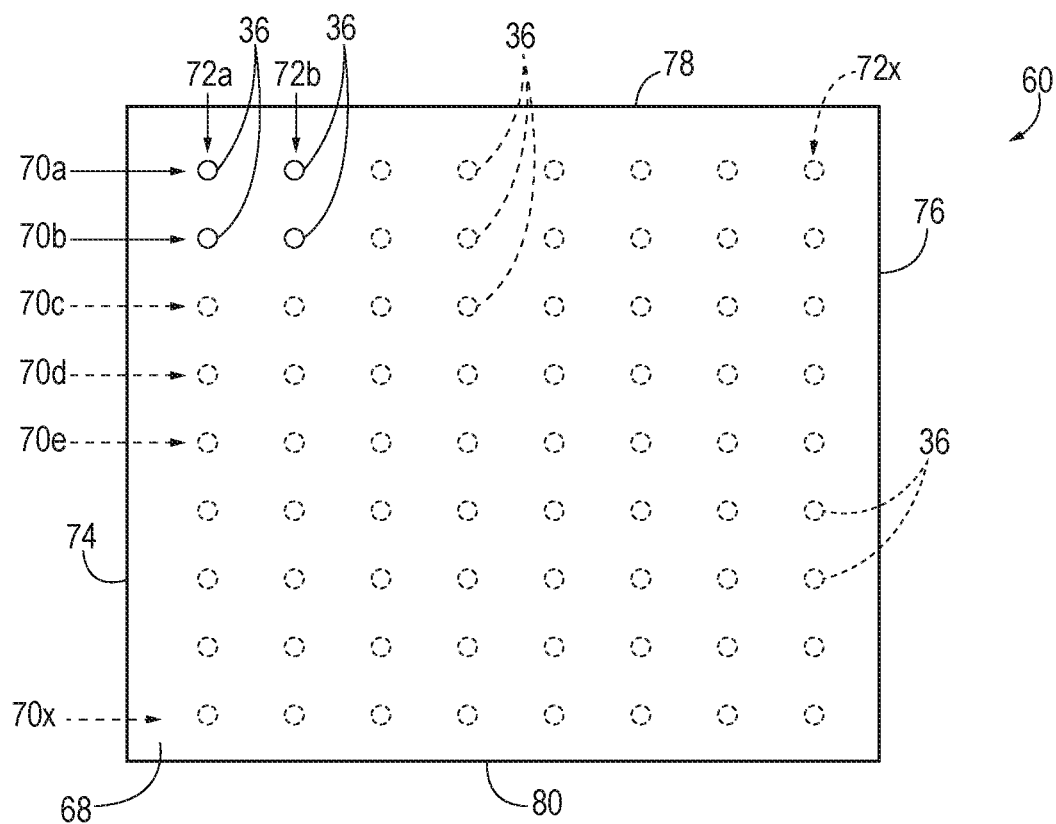
FIG. 5 is a schematic representation of examples of needle arrays according to the present disclosure, from a bottom plan view.

FIGS. 5-6 schematically illustrate examples of needle array 60 that may be used to form ultrasonic perforations in workpiece 32, according to the present disclosure. Needle array 60 includes a plurality of needles 36 arranged to form needle array 60. In an example, each needle 36 is oriented to extend along longitudinal axis 40 (FIG. 6) from a first end 62 to a second end 64. Each respective needle 36 is configured to form a respective hole, or perforation, in a workpiece when needle array 60 is vibrated along longitudinal axis 40 at an ultrasonic operating frequency while needle array 60 is positioned to repeatedly contact a surface of the workpiece (e.g., surface 34 of workpiece 32 shown in FIG. 3). For example, a needle array 60 having ten needles 36 is configured to form ten holes, or perforations, at a time within a region of a workpiece. Such holes are formed without translating needle array 60 with respect to the workpiece, without rotating the plurality of needles 36 about longitudinal axis 40, and without rotating the plurality of needles 36 with respect to the workpiece while the holes are being formed.

With reference again to FIG. 3, such perforations 44 may be within a region 66 of workpiece 32. To form perforations 44 in a different region of workpiece 32 (e.g., second region 98), workpiece 32 may be translated with respect to needle array 60, and/or needle array 60 may be translated with respect to workpiece 32 such that needle array 60 is positioned above the different region of workpiece 32 and the apparatus is operated again such that needles 36 repeatedly contact surface 34 of workpiece 32 in the different area, or region, thereby forming more perforations 44 in workpiece 32.

Perforations 44 are generally fairly small in size. For example, each perforation 44 may have diameter (or maximum dimension, in the case of non-round perforations 44) of less than 0.1 inches, less than 0.09 inches, less than 0.08 inches, less than 0.07 inches, less than 0.06 inches, less than 0.05 inches, less than 0.04 inches, less than 0.03 inches, less than 0.02 inches, and/or less than 0.01 inches. In a specific example, perforations 44 may have a diameter of between 0.04 inches and 0.05 inches. In some examples, each perforation 44 in a given workpiece 32 has a substantially uniform diameter. In some examples, a given workpiece 32 may include one or more perforations 44 that have a different size and/or shape than one or more other perforations 44 formed in workpiece 32. For example, a given needle array 60 may include a plurality of different sizes and/or shapes of needles 36 that form a plurality of different sizes and/or shapes of perforations 44 in a given region of workpiece 32. Additionally or alternatively, a first needle array 60 may be used to form perforations 44 of a first size and shape in one area of workpiece 32, while a second needle array 60 may be used to form perforations 44 of a different size and/or shape in a different area of workpiece 32.

In a given workpiece 32, each hole or perforation 44 may be spaced apart from each adjacent hole by a minimum center-to-center distance. In specific examples, the minimum center-to-center distance may be less than 0.5 inches, less than 0.4 inches, less than 0.3 inches, less than 0.2 inches, and/or less than 0.1 inches. In one specific example, the minimum center-to-center distance is between 0.13 inches and 0.15 inches. Additionally or alternatively, the minimum center-to-center distance may be larger than or equal to the diameter of each respective hole. For example, the minimum center-to-center distance may be at least 1.25 times the diameter of each respective hole, at least 1.5 times the diameter of each respective hole, at least 1.75 times the diameter of each respective hole, at least 2 times the diameter of each respective hole, at least 2.5 times the diameter of each respective hole, at least 3 times the diameter of each respective hole, at least 4 times the diameter of each respective hole, and/or at least 5 times the diameter of each respective hole.

With reference again to FIGS. 5-6, needle array 60 may include a support plate 68. In an example, each needle 36 is coupled to support plate 68 at its first end 62. In an example, each needle 36 may be integrally formed with support plate 68. Support plate 68 may serve as an interface between needles 36 and ultrasonic actuator 38 (FIG. 3) such that needle array 60 may be operatively coupled to ultrasonic actuator 38 to vibrate needle array 60 at a desired ultrasonic operating frequency, via support plate 68. In some examples, needle array 60 acts like a hone that amplifies ultrasonic vibrations from the ultrasonic actuator to increase mechanical energy output when needle array 60 is used to form perforations in a workpiece according to the present disclosure. In some examples, needle array is removably coupled to ultrasonic drilling apparatus 58 such that needle array may be selectively removed from ultrasonic actuator 38 and replaced with a different needle array 60.

Needle array 60 may include a variety of different numbers of needles, depending on the given application for needle array 60. For example, needle array 60 may include at least five needles 36, at least six needles 36, at least seven needles 36, at least eight needles 36, at least nine needles 36, at least ten needles 36, at least twenty needles 36, at least thirty needles 36, at least forty needles 36, at least fifty needles 36, at least sixty needles 36, at least seventy needles 36, at least eighty needles 36, at least ninety needles 36, and/or at least one hundred needles 36. Needles 36 of needle array 60 may be arranged in one or more rows 70 (e.g., row 70a, row 70b, etc.) of needles 36 and/or one or more columns 72 (e.g., column 72a, column 72b, etc.) of needles 36. Said columns 72 may be positioned between and substantially parallel to a first side 74 of support plate 68 and a second side 76 of support plate 68, and said rows 70 may be positioned between and substantially parallel to a third side 78 of support plate 68 and a fourth side 80 of support plate 68. Support plate 68 is illustrated as having a square-shaped footprint in FIG. 5, though support plate 68 may have any desired shape of footprint. Additionally or alternatively, needles 36 of needle array 60 may be arranged in a polar array (e.g., a circular arrangement), positioned randomly, and/or arranged in any desired shape or pattern.

In an example, needle array 60 includes a plurality of rows 70 of needles 36, each row 70 having a plurality of needles 36, and a plurality of columns 72, each column 72 having a plurality of needles 36. Needles 36 may be arranged in rows 70 and/or columns 72 according to length. For example, a first row 70a may include needles 36 having a first length and a second row 70b may include needles 36 having a second length. In some examples, the length of needles 36 may increase from row to row (e.g., from first row 70a to a last row 70x). In some examples, one or more respective rows 70 of needles 36 may include needles 36 of a different length than one or more other respective rows 70. In some examples, each respective row 70 may include needles 36 having a different respective length than each other respective row 70. In some examples, the needles 36 in a given row 70 all have a uniform length, whereas in other examples, one or more needles 36 in a given row 70 may have a different length than one or more other needles 36 in that row 70. Similarly, a first column 72a may include needles 36 having a first length and a second column 72b may include needles 36 having a second length. In some examples, the length of needles 36 may increase from column to column (e.g., from first column 72a to a last column 72x). In some examples, one or more respective column 72 of needles 36 may include needles 36 of a different length than one or more other respective column 72. In some examples, each respective column 72 may include needles 36 having a different respective length than each other respective column 72. In some examples, the needles 36 in a given column 72 all have a uniform length, whereas in other examples, one or more needles 36 in a given column 72 may have a different length than one or more other needles 36 in that column 72.

While FIG. 5 schematically represents needles 36 having a circular, or round, cross-sectional area, one or more needles 36 of needle array 60 may have a differently shaped cross-section. For example, one or more needles 36 of needle array 60 may have an oval, square, rectangular, triangular, polygonal, star-shaped, diamond-shaped, and/or other shape of cross-sectional area. Such differently shaped needles 36 may be amenable to presently disclosed ultrasonic techniques because needles 36 are not rotated during formation of the perforations. The cross-sectional area shapes of needles 36 may be selected or optimized to create correspondingly shaped perforations for improved noise attenuation performance in the resulting acoustic liners formed according to the present disclosure.

Needles 36 may be formed of any suitable materials, such as stainless steel, titanium, and/or other metals, as will be appreciated by one of ordinary skill in the art. Needles 36 may have a coating over some or all of the surface of needle 36, such as a tungsten carbide coating, though other coatings are also within the scope of the present disclosure. Second end 64 of some or all of needles 36 in needle array 60 may be beveled, shaped, coated, roughened, grooved, and/or otherwise shaped or treated, as will be appreciated by one of ordinary skill in the art. The radius and/or roughness of second end 64 of needle 36 may be selectively altered for desired properties of needle 36. Methods of making needle arrays 60 and methods of forming perforations 44 using needle arrays are disclosed in U.S. patent application Ser. No. 16/796,658, filed on Feb. 20, 2020, and titled NEEDLE ARRAYS FOR FORMING ULTRASONIC PERFORATIONS, AND METHODS OF MAKING THE SAME, the entire disclosure of which is hereby incorporated herein in its entirety, for all purposes.

Figure 13:
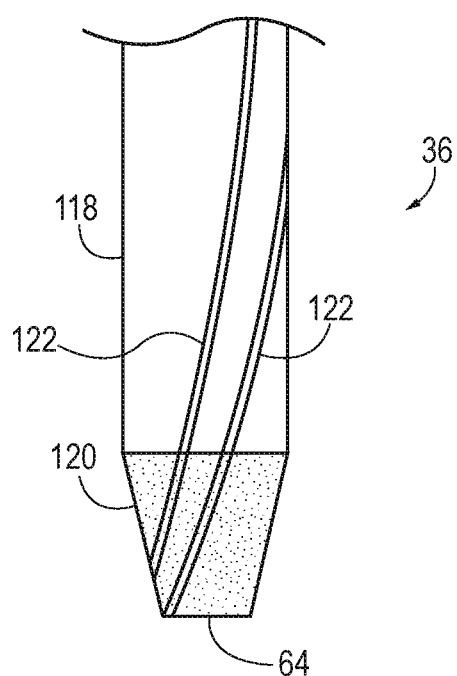
FIG. 13 is a schematic representation of an example of a needle tip for use with presently disclosed needle arrays and systems, illustrating a side elevation view of a portion of a needle.
Figure 14:
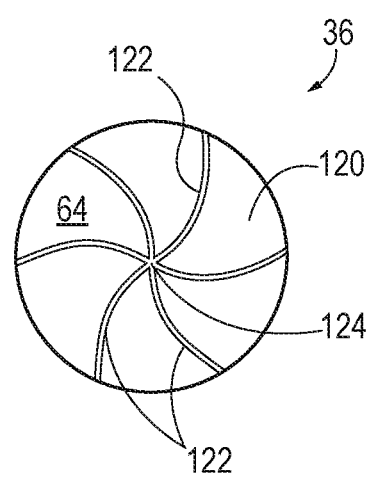
FIG. 14 is a schematic representation of an example of a needle tip for use with presently disclosed needle arrays and systems, illustrating a bottom plan view of the needle tip.

For example, FIG. 13 illustrates an example of needle 36 (which may be one of a plurality of needles 36 of needle array 60). As shown in FIG. 13, needle 36 may include a smooth shaft portion 118 and a textured, or roughened, tip portion 120 adjacent second end 64. Tip portion 120 may be conical in some examples. Needle 36 may include one or more grooves 122 formed in shaft portion 118 and/or in tip portion 120. For example, needle 36 as shown in FIG. 13 includes two grooves 122 than extend from shaft portion 118 and into tip portion 120. Other examples of needle 36 may include more or fewer grooves 122. One or more grooves 122 may be positioned just within shaft portion 118 in some examples, and/or one or more grooves 122 may be positioned just within tip portion 120. Said grooves 122 may be configured to allow removal of debris from the work area while perforations 44 are being formed in workpiece 32. FIG. 14 shows an example of needle 36 as seen from the bottom, at second end 64. As seen in FIG. 14, needle 36 includes a plurality of curved grooves 122 that meet at a central point 124 of tip portion 120, though other arrangements of grooves 122 are also within the scope of the present disclosure. In some examples, tip portion 120 may have a surface roughness of less than 20 grit, less than 40 grit, less than 60 grit, less than 80 grit, less than 100 grit, less than 120 grit, less than 140 grit, and/or less than 160 grit. In a specific example, tip portion 120 has a surface roughness of between 80-120 grit. In another example, tip portion 120 has a surface roughness of between 40-60 grit.

Figure 7:
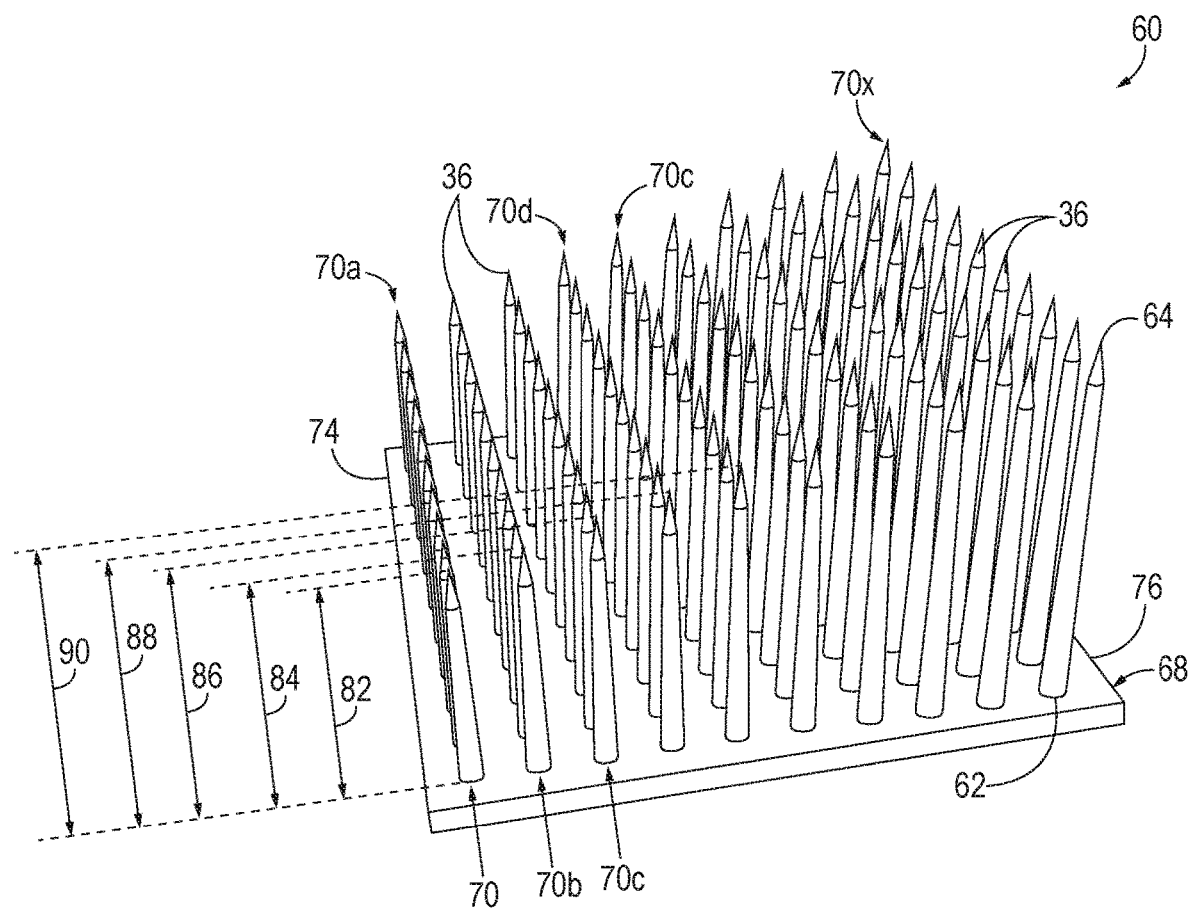
FIG. 7 is a perspective view of an example of a needle array that may be used in presently disclosed methods.

FIG. 7 illustrates one example of needle array 60. In this example of FIG. 7, needle array 60 includes first row 70a of needles 36 each having a first length 82, a second row 70b of needles 36 each having a second length 84, a third row 70c of needles 36 each having a third length 86, a fourth row 70d of needles 36 each having a fourth length 88, a fifth row 70e of needles 36 each having a fifth length 90, and so on. In this example, the length of needles 36 increases from row to row between first side 74 of support plate 68 and second side 76 of support plate 68, such that second length 84 is greater than first length 82, third length 86 is greater than second length 84, and so on, with the length of needles 36 in last row 70x adjacent second side 76 of support plate 68 being the longest, and the length of needles 36 in first row 70a being the shortest. In this example, the length of the needles in a given column 72 increases along the column between first side 74 and second side 76 of support plate 68. Other arrangements are also within the scope of the present disclosure.

Figure 8:
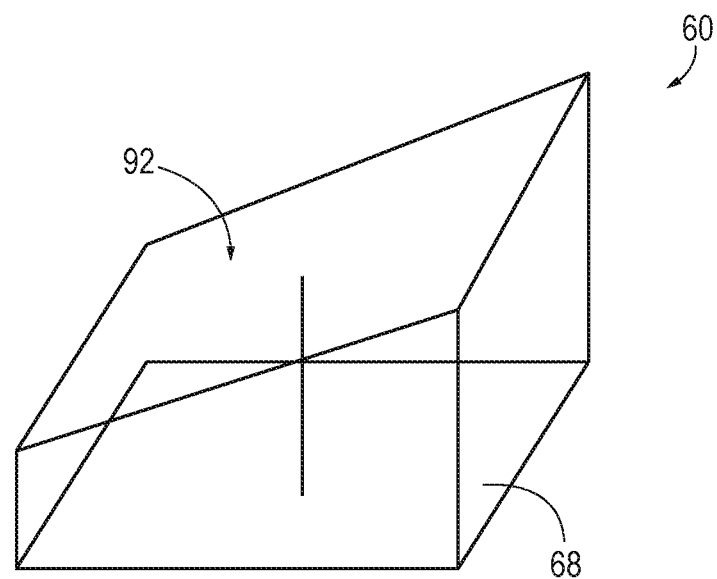
FIG. 8 is a schematic representation of an example of a distribution for needles in a needle array according to the present disclosure.
Figure 9:
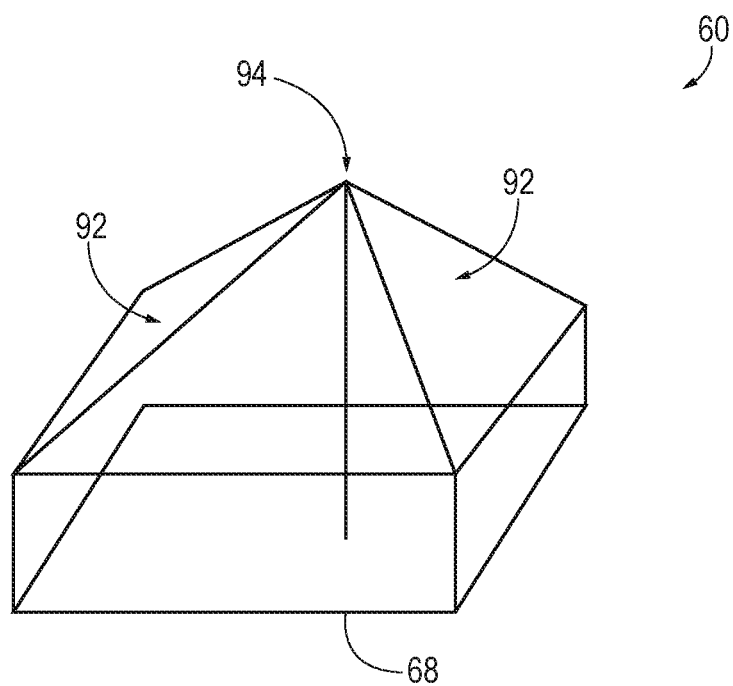
FIG. 9 is a schematic representation of another example of a distribution for needles in a needle array according to the present disclosure.

As schematically shown in FIGS. 8-9, second ends 64 of needles 36 in a given needle array 60 may collectively define a contact plane 92 or a plurality of contact planes 92 arranged with respect to one another to form a contact shape 94 (FIG. 9) or contact contour. For example, as shown in FIG. 8, needles 36 may be arranged in a bilinear distribution by their lengths, such that second ends 64 of needles 36 collectively form an angled contact plane 92 for contacting the workpiece. As another example, as shown in FIG. 9, needles 36 may be arranged in a pyramid distribution by their lengths, such that second ends 64 of needles 36 collectively form a pyramidal contact shape 94 for contacting the workpiece, with pyramidal contact shape 94 being defined by a plurality of contact planes 92 collectively defined by second ends 64 of needles 36. Other different arrangements of needles 36 may be formed to create different contact planes 92 and/or contact shapes 94. In some examples, needles 36 may be arranged to collectively define a contact contour having a curved or irregular shape. Additionally or alternatively, needles 36 may be selectively arranged by their lengths to optimize energy consumption by the ultrasonic actuator to which needle array 60 is operatively coupled. Additionally or alternatively, needles 36 of needle array 60 may be selectively arranged to maximize perforation efficiency.

With reference again to FIG. 3, systems 30 may include a remote heating unit 96 spaced apart from ultrasonic drilling apparatus 58. Additionally or alternatively, ultrasonic drilling apparatus 58 may include a heating unit coupled to ultrasonic drilling apparatus 58, and/or ultrasonic drilling apparatus 58 may effectively heat workpiece 32 by vibrating needle array 60 against workpiece 32 in the absence of a cooling fluid or coolant. Remote heating unit 96 is configured to locally heat a portion of workpiece 32 while perforations 44 are formed therein. For example, remote heating unit 96 may be positioned with respect to workpiece 32 and ultrasonic drilling apparatus 58 such that remote heating unit 96 locally heats a first region (e.g., region 66) of workpiece 32 while needle array 60 is positioned above first region 66 such that first region 66 is heated while ultrasonic drilling apparatus 58 contacts surface 34 to form perforations 44 within region 66. Remote heating unit 96 may be configured to maintain a temperature of a given region of the thin sheet material (e.g., first region 66 of workpiece 32) above a threshold temperature while perforations 44 are formed by ultrasonic drilling apparatus 58. For example, the threshold temperature may be a glass transition temperature of the resin used in the composite material from which workpiece 32 is formed. In specific examples, the threshold temperature may be at least 200 degrees Fahrenheit (° F.), at least 210° F., at least 220° F., at least 230° F., at least 240° F., at least 250° F., at least 260° F., at least 270° F., at least 280° F., at least 290° F., and/or at least 300° F. Remote heating unit 96 may be a heating lamp in some systems 30, though other types of heating units are also within the scope of the present disclosure.

Once perforations 44 are formed in first region 66 of workpiece 32, needle array 60 may be translated with respect to workpiece 32 such that needle array 60 is positioned above a different region (e.g., second region 98 of workpiece 32) such that ultrasonic drilling apparatus 58 may be used to form perforations 44 within one or more other regions of workpiece 32. Additionally or alternatively, workpiece 32 may be translated with respect to needle array 60 such that a different region of workpiece 32 is positioned under needle array 60 to form perforations in the different region of workpiece 32.

Ultrasonic actuator 38 may be configured to operate at any suitable ultrasonic operating frequency. In some examples, the operating frequency is at least 15 kilohertz (kHz), at least 20 kHz, and/or at least 25 kHz.

Figure 10:
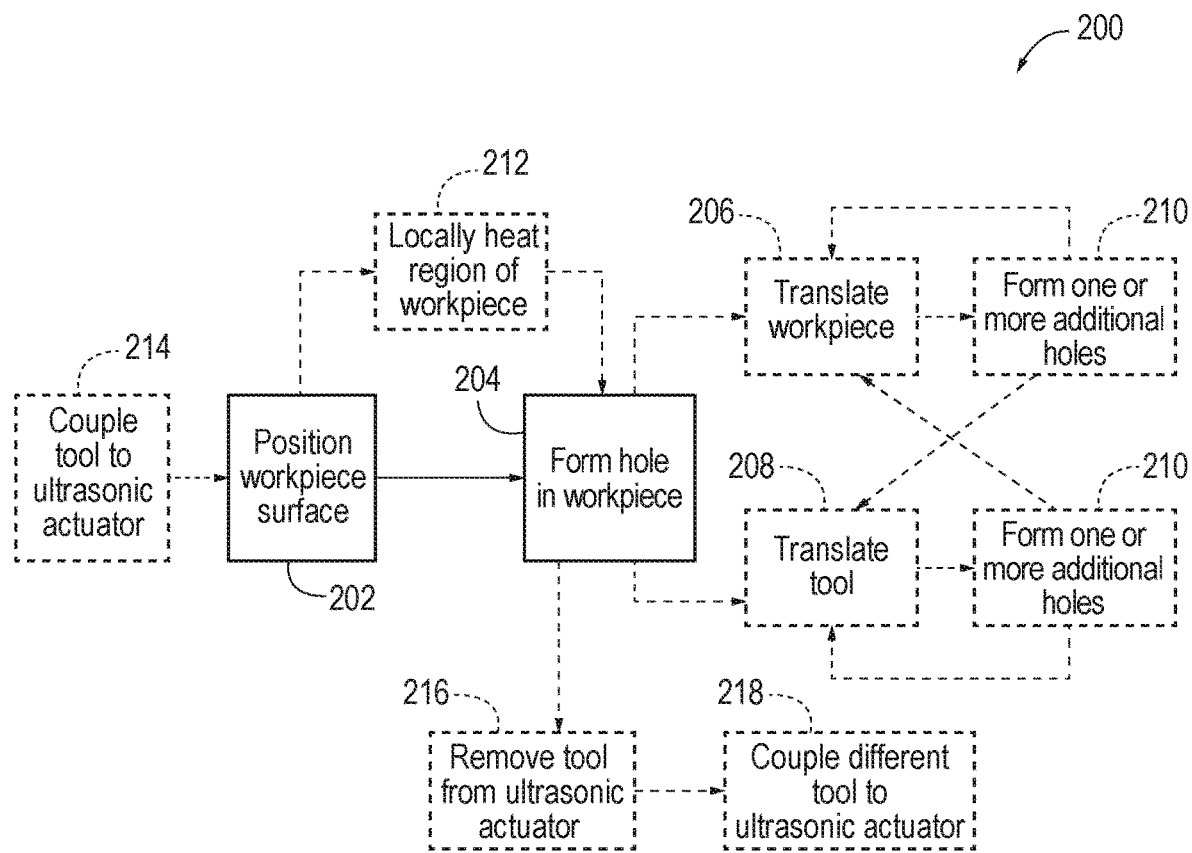
FIG. 10 is a flowchart diagram representing disclosed methods of forming one or more holes in a workpiece.
Figure 11:
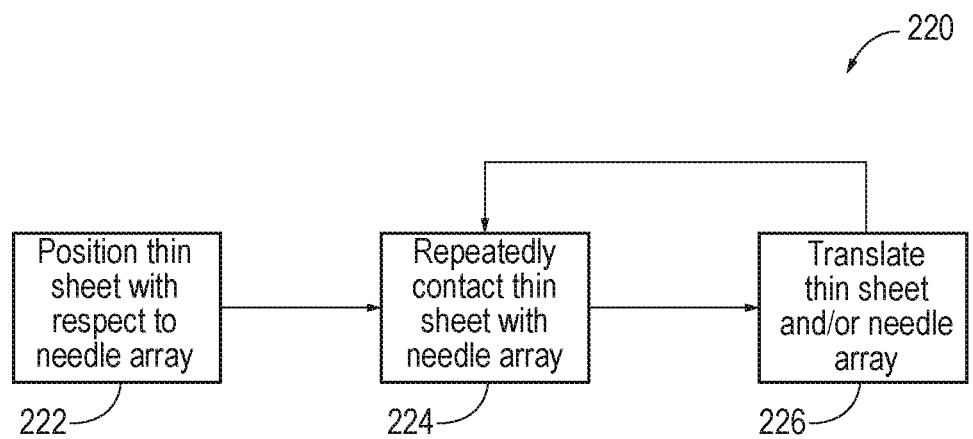
FIG. 11 is a flowchart diagram representing disclosed methods of forming one or more holes in a workpiece.
Figure 12:
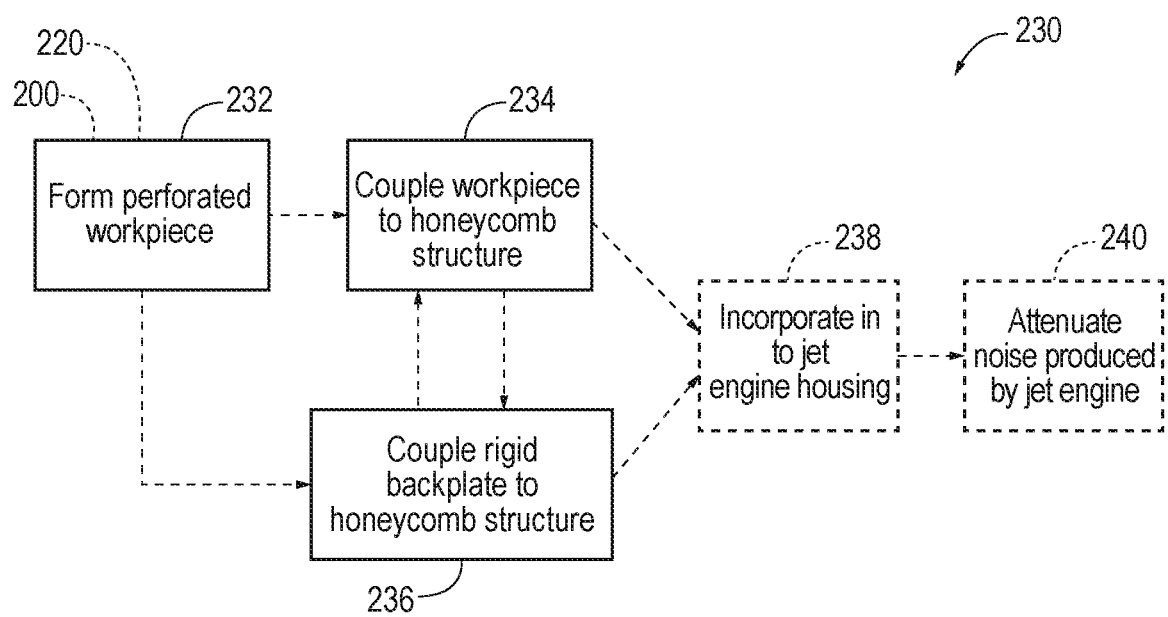
FIG. 12 is a flowchart diagram representing disclosed methods of forming an acoustic liner.

FIGS. 10-12 schematically provide flowcharts that represent illustrative, non-exclusive examples of methods according to the present disclosure. In FIGS. 10-12, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 10-12 are not limiting and other methods and steps are within the scope of the present disclosure, including methods having greater than or fewer than the number of steps illustrated, as understood from the discussions herein.

FIG. 10 illustrates methods 200 of performing ultrasonic drilling to form a hole (e.g., perforation 44) in a workpiece (e.g., workpiece 32) at a first location of the workpiece. Methods 200 generally include positioning a surface of the workpiece (e.g., surface 34) with respect to a tool of an ultrasonic hone (e.g., needle 36 or needle array 60 of ultrasonic drilling apparatus 58), wherein the tool has a longitudinal axis (e.g., longitudinal axis 40) that is substantially orthogonal to the surface of the workpiece, at 202. Methods 200 also include forming the hole in the workpiece at 204, by vibrating the tool along the longitudinal axis such that the tool repeatedly contacts the surface of the workpiece at an operating frequency and/or predefined speed sufficient to form the hole in the workpiece, wherein the vibrating the tool is performed for a time sufficient to form the hole in the workpiece. During forming the hole (or holes) in workpiece at 204, the tool is not rotated with respect to the surface of the workpiece and the forming the hole at 204 is performed without use of a slurry or a cooling fluid. In some methods 200, the force with which the tool contacts the workpiece may be limited, such that forming the hole at 204 may include vibrating the tool such that the tool exerts less than a predetermined threshold force on the surface of the workpiece each time the tool contacts the workpiece.

In methods 200 that include forming a plurality of holes in the workpiece, methods 200 may also include translating the workpiece with respect to the tool at 206, such that the tool is positioned above a different location of the workpiece than the first location where the first hole was formed and forming a second hole (or plurality of holes) in the workpiece by again vibrating the tool along the longitudinal axis while the tool is positioned above the different location, at 210. Additionally or alternatively, methods 200 may include translating the tool with respect to the workpiece at 208, such that the tool is positioned above a different location of the workpiece than the first location where the first hole was formed and forming a second hole (or holes) in the workpiece by again vibrating the tool along the longitudinal axis while the tool is positioned above the different location, at 210. Such steps may be repeated any number of times to form a plurality of holes in a plurality of different locations of the workpiece. For example, the workpiece may be translated at 206 a plurality of times, after each performance of forming one or more holes at 210. Similarly, and additionally or alternatively, the tool may be translated at 208 a plurality of times, after each performance of forming one or more holes at 210. In such a manner, the tool may be sequentially positioned above a plurality of different respective locations of the workpiece, and thus forms a respective hole or holes in each respective location of the workpiece that the needle or needle array is brought to contact according to the present disclosure.

Methods 200 may include locally heating a portion of the workpiece at 212. For example, locally heating a portion of the workpiece at 212 may include positioning a remote heating unit (e.g., remote heating unit 96) with respect to the workpiece such that the first location where the perforations are being formed is heated by the remote heating unit while the perforations are formed. Such heating at 212 may be performed before the holes are formed at 204 and/or 210, and/or heating at 212 may be performed during the formation of the holes at 204 and/or 210. In some examples, locally heating the workpiece at 212 includes maintaining a temperature of the portion of the workpiece above a threshold temperature during the forming the hole in the workpiece, such as above a glass transition temperature of a resin of the composite material from which the workpiece is formed.

Methods 200 may include coupling the tool to an ultrasonic actuator (e.g., ultrasonic actuator 38) of an ultrasonic hone, at 214, removing the tool from the ultrasonic actuator at 216, and/or coupling a different tool to the ultrasonic actuator at 218.

FIG. 11 illustrates methods 220 of forming a plurality of perforations in a thin sheet of composite material (e.g., thin sheet material 42) that generally include positioning a surface of the thin sheet with respect to a needle array operatively coupled to an ultrasonic apparatus at 222 such that the needle array is positioned above a first region (e.g., first region 66) of the thin sheet, and repeatedly contacting the surface of the thin sheet within the first region with the needle array at an operating frequency of above 20 kHz for a period of time sufficient to form a first plurality of holes in the first region of the thin sheet, at 224. Repeatedly contacting the surface of the thin sheet at 224 forms a respective hole in the thin sheet corresponding to each respective needle of the needle array, and is performed without rotating the plurality of needles about the longitudinal axis, without rotating the needles with respect to the thin sheet, and without use of a slurry or a cooling fluid.

Methods 220 also include translating the thin sheet and/or the needle array at 226 such that the thin sheet is positioned with respect to the needle array such that the needle array is positioned above a second region of the thin sheet (e.g., second region 98) and then again repeatedly contacting the thin sheet with the needle array at 224. In this manner, a respective hole is formed in the second region of the thin sheet corresponding to each respective needle of the needle array. Such translating at 226 and repeatedly contacting the surface of the thin sheet at 224 may be repeated any number of times until the desired number of holes have been formed in the desired areas of the thin sheet. Each time the needle array and/or the thin sheet is translated at 226, the needle array may be positioned above a different respective region of a plurality of regions of the thin sheet material, and the repeatedly contacting the surface of the thin sheet at 224 may be performed each time the needle array is positioned above a different respective region of the thin sheet.

FIG. 12 illustrates methods 230 of forming an acoustic liner according to the present disclosure. Methods 230 include forming a perforated workpiece (e.g., workpiece 32, thin sheet material 42) at 232, coupling the perforated workpiece to a first side of a honeycomb structure (e.g., first side 50 of honeycomb structure 48) at 234, and coupling a backplate (e.g., rigid backplate 56) to a second side of the honeycomb structure (e.g., second side 52 of honeycomb structure 48), at 236, thereby forming the acoustic liner (e.g., acoustic liner 33). Forming the perforated workpiece at 232 may include methods 220 of forming a plurality of perforations in a thin sheet of composite material (FIG. 11) and/or methods 200 of performing ultrasonic drilling to form a hole in a workpiece (FIG. 10). Methods 230 also may include incorporating the acoustic liner into a jet engine housing of an aircraft at 238 and attenuating noise produced by a jet engine of the aircraft using the acoustic liner at 240, wherein the jet engine is housed in the jet engine housing. For example, acoustic liner 33 may be applied to an internal wall of an engine nacelle, in the intake and/or bypass ducts for the dissipation of incident acoustic energy.

Illustrative, non-exclusive examples of inventive subject matter according to the present disclosure are described in the following enumerated paragraphs:

A1. A method of performing ultrasonic drilling to form a hole in a workpiece at a first location of the workpiece, the method comprising:

positioning a surface of the workpiece with respect to a tool of an ultrasonic hone, wherein the tool has a longitudinal axis that is substantially orthogonal to the surface of the workpiece; and forming the hole in the workpiece by vibrating the tool along the longitudinal axis such that the tool repeatedly contacts the surface of the workpiece at an operating frequency and amplitude sufficient to form the hole in the workpiece, wherein the vibrating the tool is performed for a time sufficient to form the hole in the workpiece, wherein the tool is not rotated with respect to the surface of the workpiece during the forming the hole, wherein the forming the hole is performed without use of a slurry or a cooling fluid, and wherein the workpiece is composed of composite material.

A2. The method of paragraph A1, wherein the hole extends through an entire thickness of the workpiece.

A3. The method of any of paragraphs A1-A2, wherein the operating frequency is at least 15 kHz, at least 20 kHz, and/or at least 25 kHz.

A4. The method of any of paragraphs A1-A3, wherein the hole is a first hole, and wherein the method further comprises:

translating the workpiece with respect to the tool such that the tool is positioned above a different location of the workpiece than the first location where the first hole was formed; and forming a second hole in the workpiece by again vibrating the tool along the longitudinal axis while the tool is positioned above the different location.

A5. The method of paragraph A4, further comprising repeating the translating the workpiece with respect to the tool a plurality of times such that the tool is sequentially positioned above a plurality of different respective locations of the workpiece, and, between each performance of translating the workpiece, forming an additional respective hole in the workpiece at the respective location by again vibrating the tool along the longitudinal axis while the tool is positioned above the respective location.

A6. The method of any of paragraphs A1-A3, wherein the hole is a first hole, and wherein the method further comprises:
   translating the tool with respect to the workpiece such that the tool is positioned above a different location of the workpiece than the first location where the first hole was formed; and
   forming a second hole in the workpiece by again vibrating the tool along the longitudinal axis while the tool is positioned above the different location.

A7. The method of paragraph A6, further comprising repeating the translating the tool with respect to the workpiece a plurality of times such that the tool is sequentially positioned above a plurality of different respective locations of the workpiece, and, between each performance of translating the tool, forming an additional respective hole in the workpiece at the respective location by again vibrating the tool along the longitudinal axis while the tool is positioned above the respective location.

A8. The method of any of paragraphs A1-A7, further comprising:
   locally heating a portion of the workpiece, wherein the first location is within the portion of the workpiece.

A9. The method of paragraph A8, wherein the locally heating the portion of the workpiece is performed prior to the forming the hole in the workpiece.

A9.1. The method of paragraph A8 or A9, wherein the locally heating the portion of the workpiece is performed during the forming the hole in the workpiece.

A10. The method of any of paragraphs A8-A9.1, wherein the locally heating the portion of the workpiece comprises maintaining a temperature of the portion of the workpiece above a threshold temperature during the forming the hole in the workpiece.

A11. The method of paragraph A10, wherein the threshold temperature is a glass transition temperature of a resin of the composite material.

A12. The method of any of paragraphs A8-A11, wherein the threshold temperature is at least 200 Fahrenheit (° F.), at least 210° F., at least 220° F., at least 230° F., at least 240° F., at least 250° F., at least 260° F., at least 270° F., at least 280° F., at least 290° F., and/or at least 300° F.

A13. The method of any of paragraphs A8-A12, wherein the locally heating the portion of the workpiece comprises locally heating the portion of the workpiece via a remote heating unit.

A14. The method of paragraph A13, wherein the remote heating unit comprises a heating lamp.

A15. The method of any of paragraphs A1-A14, wherein the tool comprises a needle array comprising a plurality of needles, wherein each needle of the plurality of needles is oriented to extend along the longitudinal axis, wherein each respective needle of the plurality of needles is configured to form a respective hole in the workpiece when the tool is vibrated along the longitudinal axis, such that the forming the hole in the workpiece comprises forming a plurality of holes within a region of the workpiece without translating the tool with respect to the workpiece and without translating the workpiece with respect to the tool.

A16. The method of paragraph A15, wherein the method further comprises heating the region of the workpiece prior to the forming the plurality of holes in the region.

A16.1. The method of any of paragraphs A15-A16, wherein the needle array comprises at least ten needles, at least twenty needles, at least thirty needles, at least forty needles, at least fifty needles, at least sixty needles, at least seventy needles, at least eighty needles, at least ninety needles, and/or at least one hundred needles.

A17. The method of any of paragraphs A1-A16.1, wherein the forming the hole comprises vibrating the tool along the longitudinal axis at a predefined speed.

A18. The method of any of paragraphs A1-A17, wherein the forming the hole comprises vibrating the tool along the longitudinal axis such that the tool exerts less than a predetermined threshold force on the surface of the workpiece each time the tool contacts the workpiece.

A19. The method of any of paragraphs A1-A18, wherein the tool is removably coupled to the ultrasonic hone.

A20. The method of any of paragraphs A1-A19, further comprising coupling the tool to an ultrasonic actuator of the ultrasonic hone.

A21. The method of any of paragraphs A1-A20, further comprising coupling the tool to a horn of the ultrasonic hone.

A22. The method of any of paragraphs A1-A21, further comprising:
   removing the tool from the ultrasonic hone; and
   coupling a second tool to the ultrasonic hone.

B1. A method of forming a plurality of perforations in a thin sheet of a composite material, the method comprising:
   positioning a surface of the thin sheet with respect to a needle array operatively coupled to an ultrasonic apparatus such that the needle array is positioned above a first region of the thin sheet, wherein the needle array comprises a plurality of needles extending along a longitudinal axis that is substantially orthogonal to the surface of the thin sheet;
   repeatedly contacting the surface of the thin sheet within the first region with the needle array at an operating frequency of above 20 kHz for a period of time sufficient to form a first plurality of holes in the first region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of a slurry or a cooling fluid;
   translating the thin sheet and/or the needle array such that the thin sheet is positioned with respect to the needle array such that the needle array is positioned above a second region of the thin sheet; and
   repeatedly contacting the surface of the thin sheet within the second region with the needle array at an operating frequency of above 20 kHz for a period of time sufficient to form a second plurality of holes in the second region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of a slurry or a cooling fluid.

B2. The method of paragraph B1, wherein the thin sheet has a thickness of less than 0.25 inches, less than 0.1 inches, less than 0.05 inches, and/or less than 0.025 inches.

B3. The method of any of paragraphs B1-B2, wherein the thin sheet is configured to be incorporated into an acoustic liner.

B4. The method of any of paragraphs B1-B3, wherein the thin sheet comprises a plurality of regions, the method further comprising:
translating the thin sheet and/or the needle array a plurality of times such that the needle array is positioned above a different respective region of the plurality of regions of the thin sheet with each respective translation of the thin sheet and/or the needle array; and
repeatedly contacting the surface of the thin sheet within each respective region of the plurality of regions of the thin sheet with the needle array at an operating frequency of above 20 kHz for a period of time sufficient to form a respective plurality of holes in each respective region of the thin sheet, wherein the repeatedly contacting the surface of the thin sheet is repeated each time the needle array is positioned above a different respective region of the thin sheet.

B5. The method of paragraph B4, wherein the repeatedly contacting the surface of the thin sheet is repeated at least as many times as needed to form at least 1,000, at least 10,000, at least 100,000, and/or at least 1,000,000 holes in the thin sheet.

B6. The method of any of paragraphs B1-B5, wherein the composite material comprises a carbon fiber reinforced polymer, a glass fiber reinforced polymer, a thermoplastic material, a thermoset material, carbon fiber or glass fiber reinforced polyether ether ketone (PEEK), carbon fiber or glass fiber reinforced polyetherketoneketone (PEKK), carbon fiber or glass fiber reinforced epoxy, and/or carbon fiber or glass fiber reinforced polyphenylene sulfide (PPS).

B7. The method of any of paragraphs B1-B6, wherein each hole of the first plurality of holes, each hole of the second plurality of holes, and each hole of each respective plurality of holes has a diameter of less than 0.1 inches, less than 0.09 inches, less than 0.08 inches, less than 0.07 inches, less than 0.06 inches, less than 0.05 inches, less than 0.04 inches, less than 0.03 inches, less than 0.02 inches, and/or less than 0.01 inches.

B8. The method of any of paragraphs B1-B7, wherein each hole of the first plurality of holes, each hole of the second plurality of holes, and each hole of each respective plurality of holes has a diameter of between 0.04 inches and 0.05 inches.

B9. The method of any of paragraphs B1-B8, wherein each hole of the first plurality of holes, each hole of the second plurality of holes, and each hole of each respective plurality of holes has a substantially uniform diameter.

B10. The method of any of paragraphs B1-B9, wherein each hole of the first plurality of holes, each hole of the second plurality of holes, and each hole of each respective plurality of holes is spaced apart from each adjacent respective hole by a minimum center-to-center distance.

B11. The method of paragraph B10, wherein the minimum center-to-center distance is less than 0.5 inches, less than 0.4 inches, less than 0.3 inches, less than 0.2 inches, and/or less than 0.1 inches.

B12. The method of paragraph B10 or B11, wherein the minimum center-to-center distance is larger than or equal to a/the diameter of each respective hole.

B13. The method of any of paragraphs B10-B12, wherein the minimum center-to-center distance is at least 1.25 times a/the diameter of each respective hole, at least 1.5 times the diameter of each respective hole, at least 1.75 times the diameter of each respective hole, at least 2 times the diameter of each respective hole, at least 2.5 times the diameter of each respective hole, at least 3 times the diameter of each respective hole, at least 4 times the diameter of each respective hole, and/or at least 5 times the diameter of each respective hole.

C1. A method of forming an acoustic liner, comprising:
forming the workpiece according to the method of any of paragraphs A1-A22;
coupling the workpiece to a first side of a honeycomb structure, wherein the honeycomb structure comprises:
the first side;
a second side opposite the first side; and
a plurality of internal cells extending between the first side and the second side, wherein each internal cell of the plurality of internal cells is sized to fit an acoustic plane wave in the internal cell for a desired frequency range such that the acoustic liner is configured to produce noise attenuation properties for the desired frequency range; and
coupling a rigid backplate to the second side of the honeycomb structure, thereby forming the acoustic liner.

C2. A method of forming an acoustic liner, comprising:
forming the thin sheet of composite material according to the method of any of paragraphs B1-B13;
coupling the thin sheet of composite material to a first side of a honeycomb structure, wherein the honeycomb structure comprises:
the first side;
a second side opposite the first side; and
a plurality of internal cells extending between the first side and the second side, wherein each internal cell of the plurality of internal cells is sized to fit an acoustic plane wave in the internal cell for a desired frequency range such that the acoustic liner is configured to produce noise attenuation properties for the desired frequency range; and
coupling a rigid backplate to the second side of the honeycomb structure, thereby forming the acoustic liner.

C3. The method of any of paragraphs C1-C2, further comprising:
incorporating the acoustic liner into a jet engine housing of an aircraft; and
attenuating noise produced by a jet engine of the aircraft using the acoustic liner, wherein the jet engine is housed in the jet engine housing.

D1. An acoustic liner, comprising:
a thin sheet material composed of composite material and including a plurality of perforations formed through a thickness of the thin sheet material, wherein the thin sheet material is the workpiece formed according to the method of any of paragraphs A1-A22 and/or wherein the thin sheet material is the thin sheet of composite material formed according to the method of any of paragraphs B1-B13;
a honeycomb structure having a first side, a second side opposite the first side, and a plurality of internal cells extending between the first side and the second side, wherein the first side is coupled to the thin sheet material, and wherein each internal cell of the plurality of internal cells is sized to fit an acoustic plane wave in the internal cell for a desired frequency range such that the acoustic liner is configured to produce noise attenuation properties for the desired frequency range; and
a rigid backplate coupled to the second side of the honeycomb structure.

D2. The acoustic liner of paragraph D1, wherein the composite material comprises a carbon-fiber or glass fiber reinforced polymer, a thermoplastic material, a thermoset material, carbon fiber or glass fiber reinforced PEEK, carbon fiber or glass fiber reinforced PPS, carbon fiber or glass fiber reinforced epoxy, and/or carbon fiber or glass fiber reinforced PEKK.

D3. The acoustic liner of any of paragraphs D1-D2, wherein the plurality of perforations comprises at least 100 perforations, at least 1,000 perforations, at least 10,000 perforations, at least 100,000 perforations, and/or at least 1,000,000 perforations formed in the thin sheet material.

D4. The acoustic liner of any of paragraphs D1-D3, wherein the acoustic liner is configured for use in a jet engine housing.

D5. The acoustic liner of any of paragraphs D1-D4, wherein the acoustic liner is formed according to the method of any of paragraphs C1-C3.

D6. The acoustic liner of any of paragraphs D1-D5, wherein the rigid backplate comprises metal, carbon fiber, and/or a fiber-based reinforced polymer.

D7 The acoustic liner of any of paragraphs D1-D6, wherein each perforation of the plurality of perforations is non-circular.

D8. The acoustic liner of any of paragraphs D1-D7, wherein one or more perforations of the plurality of perforations is square, rectangular, triangular, polygonal, star-shaped, and/or diamond-shaped.

E1. A jet engine comprising the acoustic liner of any of paragraphs D1-D8.

E2. An aircraft comprising the acoustic liner of any of paragraphs D1-D8.

F1. The use of the acoustic liner of any of paragraphs D1-D8 for reducing noise pollution and/or for noise attenuation.

F2. The use of the acoustic liner of any of paragraphs D1-D8 for reducing noise pollution from an engine and/or for noise attenuation in an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of performing ultrasonic drilling to form a plurality of holes in a workpiece at a first location of the workpiece, the method comprising:
   positioning a surface of the workpiece with respect to a tool of an ultrasonic hone, wherein the tool has a longitudinal axis that is substantially orthogonal to the surface of the workpiece, wherein the tool comprises a needle array comprising a plurality of needles, wherein each needle of the plurality of needles is oriented to extend along the longitudinal axis, wherein each respective needle of the plurality of needles is configured to form a respective hole of the plurality of holes in the workpiece when the tool is vibrated along the longitudinal axis, such that the plurality of holes are formed within a region of the workpiece without translating the tool with respect to the workpiece and without translating the workpiece with respect to the tool, wherein the plurality of needles are arranged in a distribution selected from the group consisting of a bilinear distribution and a pyramid distribution, wherein in the bilinear distribution, the plurality of needles are arranged according to their lengths such that a second end of each needle of the plurality of needles collectively form an angled contact plane for contacting the workpiece, and wherein in the pyramid distribution, the plurality of needles are arranged such that the second end of each needle of the plurality of needles collectively form a pyramidal contact shape for contacting the workpiece;

forming the plurality of holes in the workpiece by vibrating the tool along the longitudinal axis such that the tool repeatedly contacts the surface of the workpiece at an operating frequency and amplitude sufficient to form the plurality of holes in the workpiece, wherein the vibrating the tool is performed for a time sufficient to form the plurality of holes in the workpiece, wherein the tool is not rotated with respect to the surface of the workpiece during the forming the plurality of holes, wherein the forming the plurality of holes is performed without use of a slurry or a cooling fluid, and wherein the workpiece is composed of a composite material; and locally heating a portion of the workpiece via a heating unit, wherein the first location is within the portion of the workpiece during the forming the plurality of holes in the workpiece.

2. The method according to claim 1, wherein the operating frequency is at least 20 kHz.

3. The method according to claim 1, wherein the plurality of holes is a first plurality of holes, and wherein the method further comprises:

translating the workpiece with respect to the tool such that the tool is positioned above a different location of the workpiece than the first location where the first plurality of holes was formed;

forming a second plurality of holes in the workpiece by again vibrating the tool along the longitudinal axis while the tool is positioned above the different location; and repeating the translating the workpiece with respect to the tool a plurality of times such that the tool is sequentially positioned above a plurality of different respective locations of the workpiece, and, between each performance of the translating the workpiece, forming an additional respective plurality of holes in the workpiece at a respective location by again vibrating the tool along the longitudinal axis while the tool is positioned above the respective location.

4. The method according to claim 1, wherein the locally heating the portion of the workpiece comprises maintaining a temperature of the portion of the workpiece above a threshold temperature during the forming the plurality of holes in the workpiece.

5. The method according to claim 4, wherein the threshold temperature is a glass transition temperature of a resin of the composite material.

6. The method according to claim 1, wherein the needle array comprises a two-dimensional array that includes at least four needles.

7. The method according to claim 1, wherein the needle array is removably coupled to the ultrasonic hone.

8. A method of forming a plurality of perforations in a thin sheet of a composite material, the method comprising:

positioning a surface of the thin sheet and a needle array operatively coupled to an ultrasonic hone such that the needle array is positioned above a first region of the thin sheet, wherein the needle array comprises a plurality of needles extending along a longitudinal axis that is substantially orthogonal to the surface of the thin sheet;

repeatedly contacting the surface of the thin sheet material within the first region with the needle array at an operating frequency of above 20 kHz for a first period of time that is sufficient to form a first plurality of holes in the first region of the thin sheet, wherein the repeatedly contacting the surface of the thin sheet forms a respective first hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of a slurry or a cooling fluid;

positioning the needle array above the first region, wherein the positioning the needle array above the first region is performed after the repeatedly contacting the surface of the thin sheet within the first region;

translating the needle array with respect to the thin sheet such that the needle array is positioned above a second region of the thin sheet, wherein the second region is spaced apart from the first region, wherein the translating the needle array is performed after the positioning the needle array above the first region such that the needle array is not in contact with the thin sheet during the translating the needle array; and repeatedly contacting the surface of the thin sheet within the second region with the needle array at the operating frequency for a second period of time that is sufficient to form a second plurality of holes in the second region of the thin sheet, wherein the repeatedly contacting the surface of the thin sheet forms a respective second hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of the slurry or the cooling fluid.

9. The method according to claim 8, wherein the thin sheet has a thickness of less than 0.1 inches.

10. The method according to claim 8, wherein the thin sheet is configured to be an acoustic liner.

11. The method according to claim 8, wherein the thin sheet comprises a plurality of regions, the method further comprising:

translating the needle array a plurality of times with respect to the thin sheet such that the needle array is positioned above a different respective region of the plurality of regions of the thin sheet with each respective translation of the needle array; and repeatedly contacting the surface of the thin sheet within each respective region of the plurality of regions of the thin sheet with the needle array at the operating frequency for a respective period of time that is sufficient to form a respective plurality of holes in each respective region of the thin sheet, wherein the repeatedly contacting the surface of the thin sheet is repeated each time the needle array is positioned above a different respective region of the thin sheet, wherein the repeatedly contacting the surface of the thin sheet is repeated at least as many times as needed to form at least 100,000 holes in the thin sheet.

12. The method according to claim 8, wherein the composite material comprises one or more materials selected from the group consisting of a carbon fiber reinforced polymer, a glass fiber reinforced polymer, a thermoplastic material, a thermoset material, carbon fiber reinforced polyether ether ketone (PEEK), glass fiber reinforced PEEK, carbon fiber reinforced polyetherketoneketone (PEKK), glass fiber reinforced PEKK, carbon fiber reinforced epoxy, glass fiber reinforced epoxy, glass fiber reinforced PPS, and carbon fiber reinforced polyphenylene sulfide (PPS).

13. The method according to claim 8, wherein each hole of the first plurality of holes and each hole of the second plurality of holes has a diameter of between 0.01 inches and 0.06 inches.

14. The method according to claim 8, wherein each respective hole of the first plurality of holes and each respective hole of the second plurality of holes is spaced apart from each adjacent respective hole by a minimum center-to-center distance, wherein the minimum center-to-center distance is at least 1.5 times a diameter of each respective hole.

15. A method of forming an acoustic liner, comprising:
forming a workpiece, wherein the forming the workpiece comprises:
positioning a surface of the workpiece with respect to a tool of an ultrasonic hone, wherein the tool has a longitudinal axis that is substantially orthogonal to the surface of the workpiece; and
forming at least one hole in the workpiece by vibrating the tool along the longitudinal axis such that the tool repeatedly contacts the surface of the workpiece at an operating frequency and amplitude sufficient to form the at least one hole in the workpiece, wherein the vibrating the tool is performed for a time sufficient to form the at least one hole in the workpiece, wherein the tool is not rotated with respect to the surface of the workpiece during the forming the at least one hole, wherein the forming the at least one hole is performed without use of a slurry or a cooling fluid, and wherein the workpiece is composed of a composite material;
coupling the workpiece to a first side of a honeycomb structure, wherein the honeycomb structure comprises:
the first side;
a second side opposite the first side; and
a plurality of internal cells extending between the first side and the second side, wherein each internal cell of the plurality of internal cells is sized to fit an acoustic plane wave in the internal cell for a desired frequency range such that the acoustic liner is configured to produce noise attenuation properties for the desired frequency range; and
coupling a rigid backplate to the second side of the honeycomb structure, thereby forming the acoustic liner.

16. The method according to claim 15, further comprising:
incorporating the acoustic liner into a jet engine housing of an aircraft; and
attenuating noise produced by a jet engine of the aircraft using the acoustic liner, wherein the jet engine is housed in the jet engine housing.

17. A method of forming an acoustic liner, comprising:
forming a plurality of perforations in the thin sheet of the composite material according to the method of claim 8;
coupling the perforated thin sheet of the composite material to a first side of a honeycomb structure, wherein the honeycomb structure comprises:
the first side;
a second side opposite the first side; and
a plurality of internal cells extending between the first side and the second side, wherein each internal cell of the plurality of internal cells is sized to fit an acoustic plane wave in the internal cell for a desired frequency range such that the acoustic liner is configured to produce noise attenuation properties for the desired frequency range; and
coupling a rigid backplate to the second side of the honeycomb structure, thereby forming the acoustic liner.

* * * * *